Apr. 17, 1923.
J. R. POWELL
1,451,957
APPARATUS FOR THE MANUFACTURE OF BIFOCAL LENS BLANKS
Filed Feb. 27, 1922
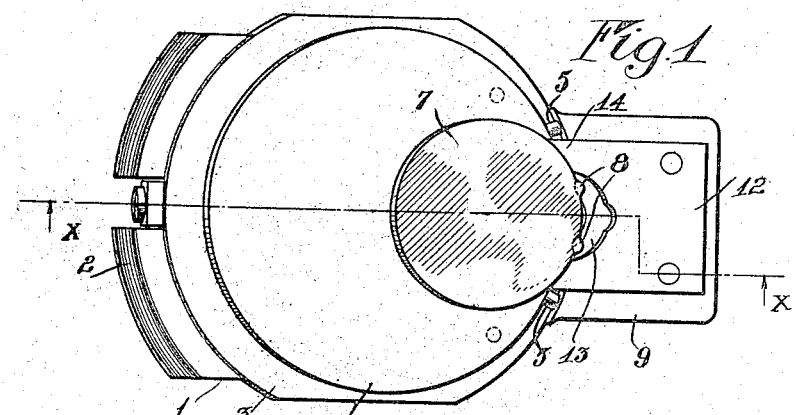
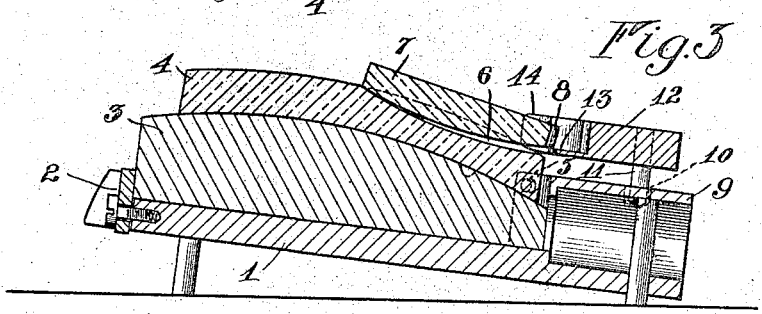
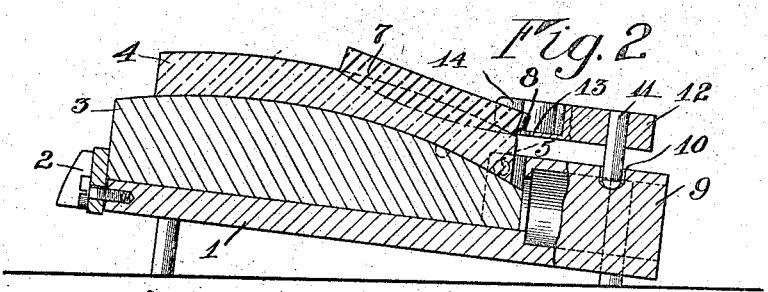
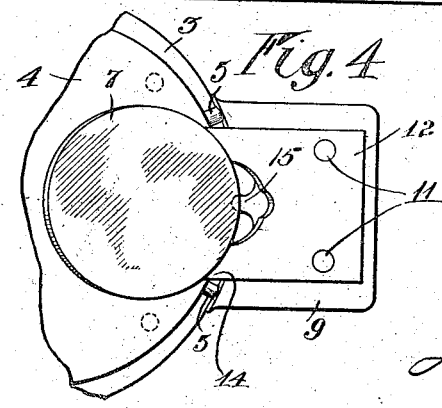
INVENTOR.
John R. Powell.
BY
his ATTORNEY.

Patented Apr. 17, 1923.

1,451,957

UNITED STATES PATENT OFFICE.

JOHN R. POWELL, OF ROCHESTER, NEW YORK, ASSIGNOR TO BAUSCH & LOMB OPTICAL COMPANY, OF ROCHESTER, NEW YORK, A CORPORATION OF NEW YORK.

APPARATUS FOR THE MANUFACTURE OF BIFOCAL LENS BLANKS.

Application filed February 27, 1922. Serial No. 539,475.

*To all whom it may concern:*

Be it known that I, JOHN R. POWELL, a citizen of the United States, and resident of Rochester, in the county of Monroe and State of New York, have invented certain new and useful Improvements in Apparatus for the Manufacture of Bifocal Lens Blanks; and I do hereby declare the following to be a full, clear, and exact description of the same, reference being had to the accompanying drawings, forming a part of this specification, and to the reference numerals marked thereon.

My present invention has for its object to provide means for forming blanks for what are known as fused bifocal lenses, that is lenses embodying a major portion for distant vision and a minor or reading portion embodying a supplemental lens of glass of a different refractive index embedded and fused in the major lens, and it has for its object to provide means for accurately positioning the minor or near vision lens during the fusing operation. To this and other ends the invention consists in the improvements hereinafter described, the novel features being pointed out in the claims.

In the drawings:

Figure 1 indicates a plan view of a device for holding the major and minor lens blanks during fusion;

Figure 2 is a longitudinal sectional view of the same.

Figure 3 is a detailed sectional view taken on the line *x—x* of Figure 1, and

Figure 4 is a modification of the minor lens supporting member.

Similar reference numerals throughout the several views indicate the same parts.

1 indicates a frame usually constructed of metal having upwardly extending flanges 2 for confining and positioning a block 3 of suitable refractory material, such as fire clay, having a smooth surface and upon which is adapted to rest the glass lens blank 4. At one end of this frame and above the level of the surface of the block 3 are provided centering lugs 5 with which the edges of the blank 4 are adapted to abut, and by means of which the blank is properly positioned. The blank 4 for the major lens is as usual provided with a recess or depression 6 in its upper surface accurately ground and polished and adapted to receive the blank 7 for the minor lens, this blank usually being made of glass of a different refractive index, and in accordance with Letters Patent No. 1,350,441, dated August 24, 1920, the minor lens blank which I prefer to employ being provided with one or more integral lateral projections 8 by which said blank is supported during the fusing operation. By using two projections on blank 7 a three point support is insured, which eliminates rocking of blank 7 during fusing operations. The main frame 1 of the device is provided with an upwardly projected portion or table 9 having near the outer end holes or sockets 10 adapted to receive pins 11 on a movable plate 12 which is provided with a support or shelf 13, and above this and on opposite sides with centering projections 14. The lens centering plate 12 is removable from the table 9 of the main frame, the pins 11 fitting loosely in their sockets 10 in such manner that while the plate can tilt vertically on the pins as on a pivot, it will nevertheless be held from excessive lateral movement at the forward end. This same loose fit of pins 11 makes possible the use of blanks 4 of a large variation in thickness.

In utilizing the invention in fusing the minor lens in position in the larger blank, the blank 4 is placed upon the block 3 with the lenticular depression in line with the end of the plate 12 and is properly centered by the lugs 5. The minor lens centering plate 12 is then placed in position with the pins in the sockets, and the minor lens blank can be placed in the position shown in Figure 2 with one edge resting upon the major lens blank 4 and the lug or projection 8 resting upon the ledge 13 of the plate 12. The whole apparatus is now placed in a suitable furnace and subjected to a temperature sufficient to soften the two adjacent surfaces of the respective blanks, and also to soften the projection 8 on the minor lens, allowing the said lens to drop into the recess 6 provided for it and the surface to fuse or coalesce. After the parts have been fused, the plate 12 is removed to release the blank, and the latter is then ground and polished in the usual manner well known to opticians.

Instead of employing the minor lens blank shown in Letters Patent No. 1,350,441, provided with the additional projection at the edge, the device could be used in connection with the usual round minor lens blank and the inner end of the supporting plate 12 could be provided with a single small supporting projection 15 located between the centering stops or lugs 14 as shown in Figure 4, the glass of the major or minor blanks softening sufficiently during the fusing operation to permit the minor blank to drop and become fused in place.

Although I prefer to employ a separate frame for the block of refractory material, it is not essential to my invention that the main support be made in two parts, as the minor lens holder is equally effective whatever the specific construction of the major lens support.

I claim as my invention:

1. In an apparatus for fusing bifocal lens blanks comprising a support for the major lens blank and a support for the minor lens pivotally mounted thereon having its free edge extended over the edge of the major lens support.

2. A holder for bifocal lens blanks comprising a support for the major lens blank having blank centering stops thereon, a support for the minor lens blank movable upon the first mentioned support having minor lens centering stops thereon, and having a portion extending over the edge of the first mentioned support.

3. A holder for bifocal lens blanks comprising a support for the major lens blank having centering stops thereon, a support for the minor lens pivoted in the first mentioned support having its free end extending over the edge of the latter, and provided with stops for engaging and centering the minor lens blank.

4. A holder for bifocal lens blanks comprising a support for the major lens blank having centering stops thereon, a support for the minor lens pivoted on the first mentioned support and removable therefrom and having its free end extended over the edge of the latter.

5. A holder for bifocal lens blanks comprising a support for the major lens blank having blank centering stops thereon, a minor lens support pivotally and removably mounted thereon with its free end extending over the first mentioned support and having centering stops at the sides thereof.

6. A holder for bifocal lens blanks comprising a support for the major lens blank having blank centering stops thereon, a minor lens blank removably pivoted thereon by a loose pin and socket connection and its free end projecting over the edge of the first mentioned support.

7. A holder for bifocal lens blanks comprising a support for the major lens blank, a minor lens support mounted on the former and having its inner end extending over the edge of the major lens blank and provided with two centering stops for engaging and centering the minor lens blank.

8. A holder for bifocal lens blanks comprising a supporting frame, a block of refractory material secured therein, a minor lens blank support movably mounted on the frame and having one end extending over the block and stops on opposite sides of said end for engaging and centering a minor lens blank.

JOHN R. POWELL.